Patented June 2, 1953

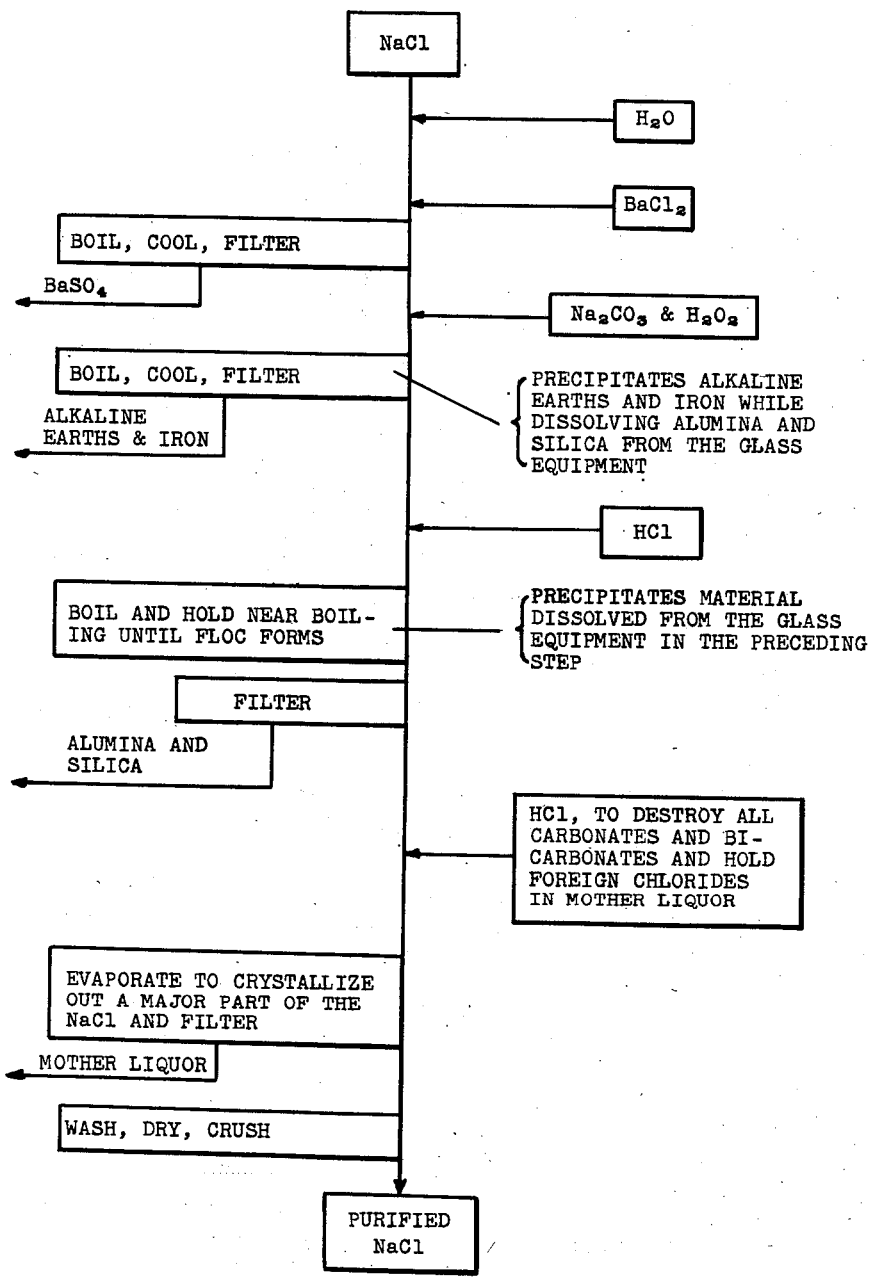

2,640,755

UNITED STATES PATENT OFFICE 2,640,755

PURIFICATION OF ALKALI METAL HALIDES

John O. Hay, Bratenahl, Ohio, assignor to The Harshaw Chemical Company, Cleveland, Ohio, a corporation of Ohio Application April 27, 1950, Serial No. 158,550

8 Claims. (Cl. 23—89)

This invention relates to a commercially feasible method of purifying, to an extent not hitherto attained except in most exacting laboratory preparations, the halide salts except fluorides of all the alkali metals. These salts of superior purity find use as the starting materials for production of optical crystals and for other purposes where the amount of impurities in regular grades of U. S. P. and C. P. chemicals is too great to be tolerated.

The process of this invention comprises an initial step in which a concentrated aqueous solution of the alkali metal halide salt to be purified is treated with the carbonate of the same alkali metal and heated at or near boiling for a sufficient length of time to precipitate as completely as possible the cations of iron and other heavy metals which form hydroxides insoluble in alkaline solutions together with cations of those alkaline earth metals which form insoluble carbonates. After the most careful filtering, however, it is found that these impurities still remain in suspension or in solution in quantities sufficient to be detrimental. In addition, if the reaction has been carried out in glass or glass lined equipment (the glass will be one which contains alkali, silica and alumina), as has been found most practical, aluminate and silicate anions dissolved from the glass by the alkaline solution have augmented the amounts of these impurities (aluminate and silicate anions) already present. I have found glass most practical, as halide salt solutions in ordinary metal equipment constructed of steel, stainless steel, nickel, Monel and copper become too contaminated with undesirable elements derived from corrosion; and the metals such as platinum are too expensive for use in the size equipment required to produce commercial quantities of the salts. To the solution is now added, as the second step and principal feature of my invention, acid, containing as an anion the same halide as in the salt being treated, in such minimum amount that the carbonate is completely converted to bicarbonate but less than enough to completely destroy the bicarbonate, and this solution is heated and allowed to stand. Aluminum and silicon are as a result precipitated as hydroxides or hydrated oxides in such form that they will floc and may be filtered off. In addition this floc accumulates various remaining impurities containing cations of heavy metals and alkaline earth metals which are likewise retained on the filter. The filtered solution is then treated with the same acid in excess to completely destroy bicarbonates and is evaporated, crystallized and dried by recognized methods.

Starting, as is preferable, with the best grade of U. S. P. or C. P. alkali metal halide salt obtainable and which has been selected for quality by comparative chemical and spectrographic analyses and using the method according to the present invention as the essential purification procedure, quantities of salts which have contained only spectrographic traces of impurities have been produced.

It should be understood that at times other steps are introduced for specific impurities which are not precipitated in the large groups of impurities brought down in the essential steps outlined above. Thus, in some cases sulfates occur in the raw salt although it is best to avoid them if possible by suitable selection of material. In this case, barium hydroxide or a barium salt of the halide in process may be added prior to the initial step to precipitate barium sulfate. In this case the excess barium is removed in the essential steps of the process. A further common practice is to oxidize the iron from the ferrous to the ferric state prior to its removal either by calcining the salt in air before solution or in most cases more readily by the addition of hydrogen peroxide to the solution at the time alkali is added in the first step. Again, a highly soluble halide impurity or another soluble alkali metal impurity may be present in amounts sufficient to be detrimental to the finished salt. If such be the case, washing of the finished crystallized salt with a saturated solution of the same purified salt or recrystallization may be practiced after the essential steps are completed.

The steps of the process may be performed under a rather wide range of conditions without departing from the essential novel features. Thus, in the addition of alkali carbonate to the solution in the first step, the amount to be used may vary over a wide range. Even if stoichiometrical amounts could be calculated which would be difficult due to time and errors of analysis, such quantity would be exceedingly small. To insure sufficient alkalinity and completion of reactions, an arbitrary amount of alkali carbonate is added which is in great excess over that required by the impurities present and which need only be limited to considerations of economics and due consideration of any impurities which may be carried into the solution even when using the best grade of C. P. or U. S. P. carbonate available. In general, it is preferred to add enough of the carbonate to attain approximately the maximum alkalinity which the particular carbonate will yield in the given salt solution and carbonate to the extent of from 0.4% up to 10%, preferably 1.25% to 2.0% by weight of the salt may be employed, weights being on the dry basis.

The pH values are incidental to the process and are not the controlling factors. In concentrated salt solutions to which sodium carbonate has been added, for example, the pH will generally range between 9.5 and 10.0 as read with glass electrodes in a standard type of Beckman pH meter, while potassium carbonate shows in KCl solution an initial pH value which is higher, being from about 11.0 to 12.0. These readings are not corrected for glass electrodes in alkaline solutions.

In the initial step the salt is dissolved in high purity distilled water in proportion to produce a solution of concentration just slightly less than saturated for that particular salt, preferably in large glass equipment, and if required for removal of sulfates, barium ions are added to precipitate barium sulfate. After this has been allowed to digest, a small amount (say from 0.5 to 5 cc. of a 30% solution per kg. of salt) of hydrogen peroxide may be added to oxidize ferrous iron and then the carbonate is added. The solution then may be boiled for a period of several hours (say 1 to 10 hours) to insure as complete a precipitation of iron and magnesium hydroxides and the insoluble carbonates of barium, calcium and strontium as possible. Included in this precipitate are also detectable amounts of insoluble compounds of aluminum, chromium, copper, lead, manganese, nickel, silicon, titanium and other metal impurities. The solution is then filtered while hot.

In the second step, the clear filtrate from the first step (which still contains some of the original impurities augmented by impurities such as ions containing boron, aluminum and silicon and possibly others derived from the glass, or if aluminates and silicates have not been derived from the glass a suitable salt containing aluminum will have been added) is treated with an amount of acid containing as anion the same halide as the salt under treatment. The amount of this acid is, again, not critical over a wide range but may lie anywhere between an amount calculated stoichiometrically to be sufficient to convert all of the carbonate to bicarbonate and an amount barely less than enough to completely destroy all the bicarbonate. In practice, the solutions have been brought to a rather low concentration of bicarbonate by the addition of an amount of acid almost sufficient to completely neutralize the total alkali content. On the first addition of this acid the pH of the solution is generally quite low and may even appear to be on the acid side as with glass electrodes readings in the range from pH 5.5 to pH 7.0 are not uncommon. However, as the reaction progresses, this pH will gradually increase until after a period of time it approaches values of 7.8 to 8.5 for sodium bicarbonate and 8.0 to 10.0 for potassium bicarbonate. In this second step of the reaction, the solution is heated to boiling for a period of time, usually from ½ to 2 hours, and then permitted to stand until visual observation indicates formation of a floc. Preferably the standing is accomplished while the solution is held just under boiling, 90 to 100° C. so that the convection currents will slowly float the precipitate through the solution accumulating size and providing maximum opportunity for the floc to adsorb any colloidal impurities. This is the preferred method for most rapid processing but it is feasible with equally good results to permit the solution to cool and with longer standing separate the same type of floc. Filter paper pulp may be added during this process as a precautionary measure to aid in retaining the precipitate on the filter but, providing the processing is carefully done, is not required. This solution is then filtered.

Analyses of this second floc show it to contain principally hydrated forms of alumina and silica, which have been shown to be largely derived from slight solution of the Pyrex or other glass or glass-lined vessel by the alkaline solutions, plus a fair quantity of compounds of magnesium, iron and tin with appreciable quantities of compounds containing such metals as boron, calcium, chromium, copper, nickel, titanium and zirconium, which either came from the glass or which escaped removal in the first alkaline step of the process.

Apparently this all-important floc is primarily due to the precipitation of aluminum hydroxide which is most insoluble in the range of 6.7 to 7.5 pH. Seemingly, this minor amount of aluminum hydroxide coagulates as a floc bringing together the greater amount of silicic acid which is formed normally at this pH in a more or less colloidal state (hydrosol) and, by adsorption and/or absorption, remaining traces of other foreign metal hydroxides and carbonates which because of their extremely fine state of subdivision, are essentially colloidal, have passed through the filter after the first step. It is, therefore, essential to provide an aluminate ion at this stage. Normally it is sufficient to use the small amount of aluminate naturally present or derived from action of the alkali on the glass vessels in the primary step. Silicate is also beneficial in that it increases the volume of the floc but is not necessary. Ordinarily it is not necessary to introduce aluminate ions in the form of an aluminum containing compound but if for some reason such as might occur if the salt were purified in a vessel which would not contribute aluminate ions to the solution, then it would be advantageous to add a small amount. The addition of amounts of an aluminum compound in the order of 0.01 to 0.1 g./l. (Al content) and much greater than normally found in the preferred method of operating in glass equipment does no harm except to slow up filtration but offers no advantage over the amount which is normally derived from glass. The aluminum compound must be soluble in the more highly alkaline solution. The preferred compounds are alkali metal aluminates corresponding to the metal of the alkali metal halides being purified or aluminum halides corresponding to the halogens of the alkali metal halides being treated, e. g. for NaCl purification sodium aluminate or aluminum trichloride, for KBr purification potassium aluminate or AlBr₃, etc.

The solution at this point (after the second filtration) contains as impurities small amounts of foreign alkali halides and other soluble salts which may be completely or largely removed in the crystallization. The more detrimental heavy metal, alkaline earth, aluminum and silicon impurities are either absent or to be found only in the faintest of spectrographic traces.

The rest of the process consists in definitely acidifying the clear solution from the previous step with a halide acid corresponding to the anion of the salt to completely destroy the bicarbonate and then crystallizing. In practice, a pH of 1.0 may be reached but is not a limiting factor. Further purification steps for removing foreign alkali metal salts and/or halides may be carried out by washing or recrystallizing the product if such is deemed desirable.

This process can be applied to the chlorides, bromides and iodides of lithium, sodium, potassium, rubidium and caesium. It fails in the case of the fluorides because of the continuing action of fluorides on glass, because one of the fluorides, that of lithium, is relatively insoluble and because of a buffering action that requires use of a great excess of HF over the amount of halide acid which is normally used in the operation of my invention.

In the accompanying drawings, the figure is a flow diagram showing one example of the invention, viz., the purification of NaCl including the optional, initial step of sulfate removal which should seldom be found necessary.

The following table illustrates by way of example the procedure as applied to several specific compounds.

bonate and make sure that any remaining foreign chlorides would be held as far as possible in the mother liquor upon crystallization. The pH at this point was about 1.0. (The acid was added slowly inasmuch as under these conditions formation of $CO_2$ can be delayed and then occur violently. The amount of acid to be added at this point is determined, of course, by the amount used in the previous addition, the total being 300 cc., an amount calculated as being an excess sufficient to destroy all alkalinity. The salt liquor was boiled down to crystallize out a portion of the purified salt, filtration being carried out when it was apparent that the mother liquor would be about 6 liters. This is not critical but it is best to leave 4 to 8 liters of mother liquor rather than carry the solution down to dryness. Some impurities are left in the mother liquor and the flasks are readily emptied. The crystals were then dried at 180° C. for about 8 hours, removed from the evaporating dish as a sintered cake and broken up into coarse granules. Improved macrocrystals have been grown from this material.

| Starting Material | NaCl | KCl | NaBr | KBr | NaI | KI |
|---|---|---|---|---|---|---|
| Dissolve in distilled | $H_2O$ | $H_2O$ | $H_2O$ | $H_2O$ | $H_2O$ | $H_2O$ |
| To precipitate sulfate if present add | $BaCl_2$ | $BaCl_2$ | $BaBr_2$ | $BaBr_2$ | $BaI_2$ | $BaI_2$ |
| Boil, stand; Thus precipitating | $BaSO_4$ | $BaSO_4$ | $BaSO_4$ | $BaSO_4$ | $BaSO_4$ | $BaSO_4$ |
| In order to oxidize Iron, etc. add | $H_2O_2$ | $H_2O_2$ | $H_2O_2$ | $H_2O_2$ | $H_2O_2$ | $H_2O_2$ |
| In order to precipitate Iron, alkaline earth metals, etc. add | $Na_2CO_3$ | $K_2CO_3$ | $Na_2CO_3$ | $K_2CO_3$ | $Na_2CO_3$ | $K_2CO_3$ |
| Boil, cool, filter; Thus removing Iron, alkaline earth metals and sulfates. Previous step to be carried out in glass or add | $AlCl_3$ | $AlCl_3$ | $AlBr_3$ | $AlBr_3$ | $AlI_3$ | $AlI_3$ |
| In order to convert all the carbonate to the bicarbonate and destroy only a portion of the bicarbonate, add a suitable quantity of | HCl | HCl | HBr | HBr | HI | HI |
| Boil and hold near boiling until floc forms; Filter; In order to destroy all the bicarbonate; Add a suitable quantity of | HCl | HCl | HBr | HBr | HI | HI |
| Evaporate to crystallize product; Filter or decant; Wash, Dry, Crush; The product is highly purified | NaCl | KCl | NaBr | KBr | NaI | KI |

The following specific examples will serve to illustrate the process:

Example I

Into a 72 liter Pyrex glass flask was placed 10 gallons (37.8 liters) of distilled water and 12,000 grams of sodium chloride of C. P. purity. The resulting solution was brought up to a temperature just under the boiling point and there was then added 150 grams of solid, C. P., anhydrous sodium carbonate and 10 cc. of a 30% aqueous solution of C. P. hydrogen peroxide. The resulting solution was boiled for approximately 2 hours to bring down a precipitate, comprised of the insoluble hydroxides and carbonates of iron, calcium, magnesium and some other impurities. The boiling was allowed to subside and the solution was filtered, suction being applied to hasten the filtration. The pH value of the resulting liquor was about 9.3 to 9.5. There was then added about 140 cc. of concentrated HCl (130–150 cc. being an optimum range), bringing the pH to about 6.5 to 7.0. The liquor was then boiled slowly for about an hour (½ to 2 hours being an optimum range) and held just below the boiling point until large flocs formed. The flocs usually can be seen within an hour or two but may sometimes require 3 or 4 hours. The pH rose to about 8. The mixture was then filtered and run into another 72 liter flask. To the hot solution was added about 160 cc. of concentrated HCl (150 to 170 cc. is an optimum quantity) to destroy the remainder of the bicar-

Example II

Into a 72 liter glass flask containing 10 gallons (37.8 liters) of distilled water was placed 20,000 grams of potassium bromide. The contents of the flask were then heated near the boiling point and an aqueous solution of barium bromide was added. The barium bromide was produced by reacting 3.0 grams of barium carbonate with 5 cc. of hydrobromic acid in 25 cc. of water. The solution was boiled vigorously for 15 minutes and the temperature then reduced to 80° C. and held overnight at that temperature to precipitate any sulfate present. There was then added to the solution without intermediate filtration 20 cc. of a 30% solution of hydrogen peroxide and 325 grams of potassium carbonate. The solution was boiled for 2½ hours and allowed to cool without agitation for 2 hours more. A filtration was then carried out for removal of barium sulfate and iron and alkaline earth carbonates and hydroxides, the pH of the solution as read at that point being about 10.7. There was then added to the solution 210 cc. of concentrated hydrobromic acid to reduce the pH to about 6.5. The solution was then boiled for one hour and held at 80° C. overnight to coagulate a floc containing compounds of aluminum, magnesium, and silicon. The solution was again filtered for removal of the aluminum, magnesium, and silicon compounds, the pH at that point being about 9.0. Hydrobromic acid was then added to the extent of 150 cc. to bring the pH to about 1.0 and destroy any bicarbonate present. The solution was then evaporated down to the point where crystals began to form and for 30 minutes thereafter. The mixture was then allowed to cool overnight and the crystals were separated from the mother liquor. The mother liquor was evaporated further and cooled, whereupon a second crop of crystals was obtained. The wet crystals were washed with a saturated solution of potassium bromide for the purpose of lowering the sodium content and then dried. The resulting crystals were of greatly improved purity as compared with the original potassium bromide which itself was of C. P. quality.

In all these cases, it will be understood that the concentration of impurities is very low and that determination of the exact amounts present before and after the purification process is not practicable. By spectrographic methods it can be determined that the purity is greatly improved but quantitative comparisons are not feasible. By growing optical crystals from the purified materials, it can be demonstrated that a definite improvement is obtained by the above described procedure.

Example III

Into a 72 liter flask containing 2.1 gallons (8 liters) of distilled water was placed 20,000 grams of sodium iodide. The contents of the flask were then heated to effect solution and 10 cc. of hydrogen peroxide and 97 grams of sodium carbonate were added. The solution was boiled ½ hour and allowed to stand before filtering off the cake containing iron hydroxide and other insoluble impurities. To the clear filtrate was added 157 cc. of freshly distilled hydriodic acid (47%). This solution was then boiled for one hour and held just under boiling over night. The considerable floc was filtered off and the filtrate acidified with 112 cc. of hydriodic acid (47%). This filtrate was taken to crystals in several four-liter beakers as it was found to cake too badly in the 72 liter flask normally used for other salts. After filtering, washing, and drying, the crystals weighed 15,290 grams. Spectrographic analysis showed them to be quite pure and considerably better in this respect than the starting material. The equipment used in this example was glass.

From the foregoing description, it will be seen that the essence of the invention resides in the production of a floc which carries down very small traces of colloidal or suspended materials which cannot be removed by filtration. This floc is produced under critical conditions, viz., following up an alkali precipitation step which removes certain impurities and leaves very slight traces of suspended matter with a treatment by acid in amount sufficient to convert all the normal carbonate to bicarbonate and to go further and destroy part of the carbonate, but the amount should not be sufficient to destroy all of the carbonate. Under these conditions, the floc is formed from alumina and silica dissolved from the glass in the alkali precipitation step or from added aluminum compound if the reaction is carried out in, for example, platinum. The floc is held in contact with the solution for a period of time and separated, whereupon further acid is added to destroy the bicarbonate and the product is crystallized out. It is preferred to operate in glass equipment since platinum equipment is more expensive and the slight amount of glass which is dissolved is adequate to form the floc and other impurities derived from the glass are removed by the floc down to minute traces.

Having thus described my invention, what I claim is:

1. In a process for purification of alkali metal halides to a state of purity in respect to heavy metals and alkaline earth metals exceeding that of U. S. P. or C. P. alkali metal halides, the steps of contacting an aqueous solution, substantially free of sulfate ion, of an alkali metal halide of the class consisting of alkali metal chlorides, bromides and iodides, said aqueous solution being already of relatively high purity, but containing very small quantities of metal compounds as impurities, in equipment having an aluminum-containing glass surface in contact with the solution, with a quantity of the carbonate of the alkali metal being purified amounting to at least 0.4% of the weight of the salt and not exceeding 10% thereof, percentages being by weight, dry basis, separating the resulting insoluble carbonate precipitate from the solution, adding a quantity of acid having the same anion as the salt being treated, in quantity more than one mol but less than two mols per mol of previously added carbonate, whereby dissolved alumina is precipitated in the form of an aluminum-containing floc and some of said carbonate remains in the form of bicarbonate, separating the resulting precipitate, adding sufficient of said acid to react with all said bicarbonate and crystallizing out the alkali metal halide being purified.

2. The process defined in claim 1 wherein said alkali metal halide is NaCl, said carbonate is $Na_2CO_3$, and said acid is HCl.

3. The process defined in claim 1 wherein said alkali metal halide is KBr, said carbonate is $K_2CO_3$ and said acid is HBr.

4. In a process for purification of alkali metal halides to a state of purity in respect to heavy metals and alkaline earth metals exceeding that of U. S. P. or C. P. alkali metal halides, the steps of contacting an aqueous solution, substantially free of sulfate ion, of an alkali metal halide of the class consisting of alkali metal chlorides, bromides and iodides, said aqueous solution being already of relatively high purity, but containing very small quantities of metal compounds as impurities, with a quantity of the carbonate of the alkali metal being purified amounting to at least 0.4% of the weight of the salt and not exceeding 10% thereof, percentages being by weight, dry basis, and an aluminum compound soluble in the resulting solution, separating the resulting insoluble carbonate precipitate from the solution, adding a quantity of acid having the same anion as the salt being treated, in quantity more than one mol but less than two mols per mol of previously added carbonate, whereby dissolved alumina is precipitated in the form of an aluminum-containing floc and some of said carbonate remains in the form of bicarbonate, separating the resulting precipitate, adding sufficient of said acid to react with all said bicarbonate and crystallizing out the alkali metal halide being purified.

5. The process defined in claim 4 wherein said alkali metal halide is NaCl, said carbonate is $Na_2CO_3$, and said acid is HCl.

6. The process defined in claim 4 wherein said alkali metal halide is KBr, said carbonate is $K_2CO_3$ and said acid is HBr.

7. In a process for purification of alkali metal halides to a state of purity in respect to heavy metals and alkaline earth metals exceeding that of U. S. P. or C. P. alkali metal halides, the steps of contacting an aqueous solution, substantially free of sulfate ion, of an alkali metal halide of the class consisting of alkali metal chlorides, bromides and iodides, said aqueous solution being already of relatively high purity, but containing very small quantities of metal compounds as impurities, in equipment having an aluminum-containing glass surface in contact with the solution, with a quantity of the carbonate of the alkali metal being purified amounting to at least 1.25% of the weight of the salt and not exceeding 2.0% thereof, percentages being by weight, dry basis, separating the resulting precipitate from the solution, adding a quantity of acid having the same anion as the salt being treated, in quantity more than one mol but less than two mols per mol of previously added carbonate, whereby dissolved alumina is precipitated in the form of an aluminum-containing floc and some of said carbonate remains in the form of bicarbonate, separating the resulting precipitate, adding sufficient of said acid to react with all said bicarbonate and crystallizing out the alkali metal halide being purified.

8. In a process for purification of alkali metal halides to a state of purity in respect to heavy metals and alkaline earth metals exceeding that of U. S. P. or C. P. alkali metal halides, the steps of contacting an aqueous solution, substantially free of sulfate ion, of an alkali metal halide of the class consisting of alkali metal chlorides, bromides and iodides, said aqueous solution being already of relatively high purity, but containing very small quantites of metal compounds as impurities, with a quantity of the carbonate of the alkali metal being purified amounting to at least 1.25% of the weight of the salt and not exceeding 2.0% thereof, percentages being by weight, dry basis, and an aluminum compound soluble in the resulting solution, separating the resulting insoluble carbonate precipitate from the solution, adding a quantity of acid having the same anion as the salt being treated, in quantity more than one mol but less than two mols per mol of previously added carbonate, whereby dissolved alumina is precipitated in the form of an aluminum-containing floc and some of the carbonate remains in the form of bicarbonate, separating the resulting precipitate, adding sufficient of said acid to react with all said bicarbonate and crystallizing out the alkali metal halide being purified.

JOHN O. HAY.

References Cited in the file of this patent

UNITED STATES PATENTS

| Number | Name | Date |
|---|---|---|
| 1,308,509 | Rüber | July 1, 1919 |
| 1,924,503 | Lambert | Aug. 29, 1933 |

OTHER REFERENCES

"Catalog of Baker's Analyzed C. P. Chemicals and Acids" (Jan. 1, 1935), pp. 93, 95. Published by the J. T. Chemical Co., Phillipsburg, N. J.